United States Patent Office 3,507,662
Patented Apr. 21, 1970

3,507,662
NITROGENOUS ANIMAL FEEDS
Francoise Andree Jeanne Leroy, St.-Leu-la-Foret, Zelmen Zelter and Andre Charles Francois, Paris, and Andre Chassin and Jacques Rodeau, Chabanais, France, assignors to Établissement Public: Institut National de la Recherche Agronomique and Societe Anonyme Produits Chimiques et Celluloses Rey, both of Paris, France, and both corporations of France
No Drawing. Filed Feb. 3, 1966, Ser. No. 524,837
Claims priority, application France, Feb. 3, 1965, 4,208; Feb. 8, 1965, 4,787
Int. Cl. A23k *1/00, 3/00*
U.S. Cl. 99—2                                27 Claims

ABSTRACT OF THE DISCLOSURE

A method of protecting nitrogenous animal feeds from bacterial deamination which comprises forming a paste with water, a nitrogenous feed and an organic tanning substance, which form complexes which stabilize proteins against bacterial action and are dissociable by proteolytic enzymes, allowing this mixture to stand and react until there are practically no remaining soluble nitrogen compounds and drying the product at a temperature not exceeding 80° C.; and the feed product.

---

The present invention relates to nitrogenous feeds of vegetable or animal origin used for feeding animals. More particularly the invention relates to a process for preparing nitrogenous feeds which are otherwise liable to be partially or totally degraded into ammonia by the intestinal flora.

In the present description, the term "nitrogenous feeds" refers to soluble and insoluble, native and denatured proteins, all the polypeptides, amino acids, amides etc., and generally speaking all the natural and synthetic compounds which exist, appear or may appear in the chemical or enzymatic degradation of proteins.

Among the nitrogenous feeds for consumption by animals, and suitable for use in the process of the invention may be mentioned: oil-seed cakes, fodder plant and cereal flours or conglomerates, blood, meat or fish meal, caseins, urea, synthetic amino acids and, in fact, all nitrogenous materials used in animal feeds and apt to be degraded by the bacteria in the alimentary tract, and more especially into ammonia, viz. powdered milk, lactic casein, meat meal, fish meal (tuna, sardine, whale, herring, etc.) fowl feather meal, fowl giblet meal, soluble fish, fish hydrolysates and autolysates, blood meal, various gelatines, dried lactalbumines, skimmed milk, fodder plant meal, or peanut, linseed, turnip, poppy-seed, palm cabbage, sesame, soya and sunflower seed cake, brewer's yeast, maize glutin, Torula yeast, lactic yeast, baker's yeast, etc.

The invention provides means for protecting nitrogenous feeds from bacterial degradation in the alimentary tract of animals.

This phenomenon, which is detrimental to the nutritive effectiveness of nitrogenous feeds is more especially manifest in ruminants and in general all polygastric animals, due to the presence in one of their stomach cavities, the rumen, of an abundant and very active deaminating microflora, living there in symbiosis with the host. However, it also exists in species having single stomach (mono-gastric species) where deamination is effected by the bacteria of the intestine.

In the case of ruminants, for instance, the nutritive effectiveness of nitrogenous feeds consumed is subject to very complex mechanism in the rumen. The bacterial micropopulation is responsible for the greater or lesser degree of deamination of proteins. It then becomes impossible for these bacteria to use the total amount of ammonia formed by their own activity for the synthesis of their proteins digested in the ulterior compartments of the alimentary tract. A very large fraction, about two-thirds, of this amount of ammonia is eliminated by the system in the form of waste matter in the urine, consequently causing a loss of alimentary nitrogen which may be as great as 40 to 60% according to the type of nitrogenous feed. Such a loss is obviously prejudicial to the effectiveness of the nitrogeneous feed, that is to say, to the growth and production of animals.

It is known that the bacterial deamination faculty of nitrogenous feeds is closely linked to their physiochemical properties, and especially to their degree of solubility. The most striking examples are casein which is entirely soluble and is almost totally degraded and, on the contrary, dry distillery yeasts whose absolutely insoluble nitrogen does not generate ammonia in the ruminant's paunch.

The hardening of proteins by a very intensive thermal treatment provides only a very insufficient means of protection against deamination. Furthermore, it has the very serious drawbacks of making proteins more indigestible and causing destruction and a notable reduction of the biological availability of essential amino acids.

The use of tennins in animal feeding has already been suggested. Certain documents illustrating the prior techniques are mentioned hereinbelow.

U.S. Patent No. 2,564,106, filed on Oct. 29, 1948 and granted on Aug. 14, 1951 relates to antioxidant mixtures for incorporation into animal feeds, consisting essentially of synergistic mixtures of beta-substituted mercaptopropionic acids with antioxidant compounds, among which the tennins are mentioned. For the very special purpose which is the object of U.S. Patent No. 2,564,106, the antioxidant mixture is used in very small amounts, not greater than 1% by weight.

French Patent No. 1,110,038 filed on Oct. 14, 1954 and granted on Oct. 5, 1955, also concerns complex antioxidant preparations for the treatment of animal feeds. In these preparations it is possible to use substances capable of blocking mineral elements in a complex state, inactive on the oxidizability of liquids, such as phosphates or tannins.

French Patent No. 1,261,199, applied for on Jan. 7, 1960 and granted on Apr. 10, 1961, describes complete compound animal feeds. It provides for the use in these feeds of substances to encourage appetite, such as tannins, gentian, cinchoan etc.

The invention turns to account the property possessed by natural or synthetic organic tanning substances of rendering proteins insoluble and increasing their resistance to proteinases. It will be remembered that natural substances possessing the power of tanning are of very dissimilar nature and composition. They are classified into two main groups which, although they both include polyphenolic acids, are distinguished by their aptitude to be hydrolized into their simple components. The highly astringent tannins are the ones which possess the greatest affinity with proteins. These two groups are:

Condensed or catechic tannins which are not hydrolyzable by enzymes (tannase, emulsin . . . ) into their components and provide pyrocatechol on dry distillation.

Hydrolyzable tannins which are esters of hexoses and phenol carbonic acids such as tannic acid, gallic acid, ellagic acid (ellagitannins); the ellagitannins are sometimes classified in a separate group.

The tannins of the last group are degraded by hydrolyzing enzymes into their components.

It is therefore an essential object of the invention to protect nitrogenous feeds from bacterial degradation and avoid the serious drawbacks of intensive heat treatment. It renders nitrogenous feeds resistant to attack by bacteria in the rumen, but in such a way as to leave them completely accessible to the indispensable action of proteolytic enzymes which occurs in the other organs of the digestive apparatus. The treatment advocated in no way disturbs the no less essential activity of the cellulolytic bacteria of the rumen, whose role in the assimilation of glucide foods, especially fodders, is primordial for ruminants, for instance.

Generally speaking, the process of the invention for obtaining nitrogenous feeds for animals, especially polygastric animals, with a view to protecting the said feeds from bacterial deamination, uses a tanning substance and is characterized by the reaction in an aqueous medium of at least one nitrogenous feed and at least one tanning substance, so as to form a paste which does not exude any liquid, and which is left to react until analysis shows that there is practically no remaining soluble nitrogen, then drying the product at a temperature not higher than 80° C.

All tanning substances of natural or synthetic origin (such as short-chain aldehydes, actaldehyde, glyoxal and glutaraldehyde for instance) which possess the property of stabilizing proteins in the state of complexes which are inaccessible to bacterial action, but are dissociable by proteolytic enzymes of the alimentary tract, may be used in the invention.

Hydrolysable tanning extracts are preferably used for the process of the invention.

Commercial tanning substances which can be used in the process of the invention are essentially of vegetable origin: bark, wood, roots, trunks, leaves, etc. of chestnut, oak, myrobalan, valonia, quebracho, mimosa, eucalyptus. Among native woods, oak and chestnut are usually used for making tannin.

The tannic extract of chestnut wood is especially suitable for use in the invention. It belongs to the group of pyrogallic tannins, more especially to that of the ellagitannins. It contains free gallic acid, free ellagic acid and polyphenol compounds (of ill defined structure) which are probably hexoses derived from gallic acid. After hydrolysis it gives gallic acid, ellagic acid and hexoses (about 10), about half of which is glucose.

An extract such as this can be otbained from chips which are submitted to methodical extraction by hot water, at about 80° C. for instance, after which the extract may be concentrated in vacuum to obtain a paste which is dried and which provides a fine powder.

All commercial forms of tannin are suitable for use in the invention, but it should be noted that the process described may use all other natural or synthetic tanning substances which, like chestnut tannin, possess the property of forming complexes with edible proteins which resist bacterial degradation but are dissociable by the proteolytic enzymes of the alimentary tract without inhibiting the bacterial cellulolytic activity in the ruminant's paunch.

The characteristics of the process of the invention which have been described hereinabove are critical for obtaining a proper combination between tanning substances and nitrogenous feeds.

The theoretical nature of the combinations of tannins and proteins is still not properly understood. The lyophilic character of tannins is, however, known. While in no way limiting the scope of the invention by theoretical explanations, it may be taken that the very lyophilic nature of free or easily freeable amino acids determines the swelling of proteins, which encourages the formation of tannin-protein complexes which are very stable owing to their molecular structure which has an extremely reduced affinty with water. The tannins and proteins are thus probably oined at several points of the molecule of the latter. The iaison could occur both by electrolvalence or coordination.

The invention has shown that several factors play a critical part in the elaboration of the nitrogenous feeds with the tanning substance.

The first factor is the quantity of tanning substance used. The requisite condition is that the dose of tannin used should not be toxic and should be sufficient to block at least the major portion and preferably the quasi-total portion of the amine and amide groups to be protected in the nitrogenous feed. The invention has shown, for instance, that the tanning substance should be incorporated in an amount of from 3 to 40% by gross weight of the total nitrogenous materials. The preferred range generally being between 9 and 15%. For values of less than 3% the desired results, that is to say, the protection of proteins against bacterial degradation, is practically not obtained. In general from 15% upwards the results obtained are not economically better than for values of between 9 and 15%.

A second essential factor which should be taken into account in the process of the invention is the amount of water incoprated in the dry mass of nitrogenous feed, that is to say, in the mixture of crude protein and tanning substance. There should be a sufficient amount of water to allow subsequent swelling of the proteins, but it should not be in excess with respect to this amount. In general an amount of water in the range of 2.5 to 3 times the weight of the nitrogeneous feed to be treated answers the purpose. The choice of temperature of the water incorporated is also important. Water at a temperature of up to 60 to 70° C. may be used, but the results are no more satisfactory than when water at a normal temperature is used. Therefore it is preferable, for obvious economical reasons, to use water at the ordinary temperature. On the other hand, water heated to 95–100° C. before being incorporated with the dry mixture of the tanning substance and the nitrogenous feed causes lumping phenomena. The particles of nitrogenous feeds embedded inside these lumps therefore mostly escape tanning and they are thus not protected from bacterial degradation.

It should, moreover, be noted that it is often preferable to carry out dry homogenization of the tanning substance and the nitrogenous feed before incorporating the water. In practice the nitrogenous feed, consisting, for instance, of an oil-seed cake, a blood meal, lucern, etc . . ., is ground to a fine particle size. The tanning substance is then mixed with it until it is evenly coloured and then the water is incorporated.

In the case where the nitrogenous substance is contained in a product which has previously been dried it is made to absorb the amount of water which was previously eliminated, by soaking for example.

The substance with a tannin base may also be added in the form of an aqueous solution according to the stirring method used.

The addition of water to the previously dried homogenized mixture of tanning extract and nitrogenous substance constitutes a method of carrying out the invention which is sometimes preferable to that which consists of preparing a separate tanning substance which is progressively added to the protein. In this latter case, the formation of lumps is sometimes witnessed, which results in the tannin being spread unevenly through the feed. For instance by carefully dry homogenizing 100 parts of powdered cake with 10 to 15 parts of powdered chestnut tannin an even colour is obtained. By progressively incorporating, while stirring, 250 to 300 parts of water an even colouring of all the particles was then obtained. On the other hand, for 100 parts of feed 10 to 15 parts of powdered chestnut tannin were previously dissolved in 250 to 300 parts of ordinary water. The resulting aqueous solution may include conglomerates of tannin particles, in which case, to obtain an even tannin of the feed, and consequently satisfactory results for the protection of proteins from bacterial degradation, it is first necessary to dissolve these conglomerates before incorporation of the solution with the nitrogenous feed.

After the abovementioned amounts of water have been incorporated into the mixture of tanning substance and the nitrogenous feed the mass is stirred for a short time, for from 3 to 5 minutes for instance, until a homogenous paste with nothing exuding is obtained. The paste thus obtained is left to stand until analysis shows that there is practically no residual soluble nitrogen remaining in the paste. For this purpose a temperature not exceeding 22° C. is generally used for 8 to 16 hours to avoid fermentation. This period of standing is necessary for the proteins to swell and the tannin to be fixed. Occasional agitation facilities swelling of the proteins and allows any liquid which may exuded to be reincorporated.

It should be noted that the higher the dose of tannin the longer is the time taken for the liquid to be absorbed.

On the other hand, the feed without tannin, treated with the same amount of water, absorbs it immediately but produces an exudate after two hours. This period of standing is in certain cases an essential factor of the process of the invention, especially for the treatment of small amounts of crude material. As a general rule if the moist paste is left to stand for longer than 16 hours fermentation is seen to start, which degrades the proteins. Therefore, a suitable feed is not obtained as its protein content is reduced.

Whatever may be the nitrogenous substance and the tannin based substance brought together according to the process of the invention it is particularly advantageous to control and possibly alter the pH of the reacted mixture in the various stages of the process.

In particular, the aqueous solution of the tanning substance may be alkalized (up to about pH 8 or 9) to facilitate penetration of the tannin, the mixture of tannin-nitrogenous substance being acidified, for instance, during the period the mixture is left to stand to allow the reaction to take place.

In a further stage of the process of the invention the paste is dried until a residual humidity of from 8 to 10% is obtained. Drying can be carried out in a thin layer, either in a dryer with circulating air or in a standard type atomizer. As far as possible the temperature of the mass during drying should not exceed 80° C. It should be all the lower the longer the drying time: in a dryer it is advisable to operate at between 65 and 80° C. during the first 24 hours and subsequently at about 50° C. The dried mass should finally be ground into very fine particles, with a standard grinder for instance, to facilitate its homogenous incorporation into any feed mixture prepared industrially or on the farm, in the form of meals or conglomerates for farm animals of all ages (bovines, sheep, pigs, poultry, horses, the cat family, goats, dogs).

The amount of nitrogenous feeds, tanned according to the process of the invention, to be introduced into cattle food is preferably calculated so that the concentration of tannin incorporated is not greater than 2.5% in the total dry ration of the animal's daily ration, in order to avoid all risk of toxicity.

As animal feeds generally contain sodium chloride it is particularly advantageous to carry out this addition during the operation of mixing the tannin and nitrogenous substance, since sodium chloride promotes the precipitation of proteins.

Certain tests carried out in an artificial rumen on protein feeds protected by special vegetable tannin have already been carried out in certain prior experiments.

The process of the invention leads, however, to surprising results. In this connection, certain types of tannin have a negative action on the efficiency of proteins.

For example, S. I. Chane, H. I. Fuller (Poultry Science 1964, 43, 1, 30–36, "Effect of Tannin Acid Content of Grain Sorghum on Their Feeding Value for Growing Chicks") have shown that, in monogastric animals, sorghum tannin prevents digestibility of the protein of these grains. These authors found that the higher the tannin content of the sorghum the lower is their utilization by growing fowls.

Huisman thesis 1946, Wageningen University, quoted by E. Brouwer. "Some Observations in Holland on Protein Materials in the Feeding of Domestic Animals" (Ed. Desoer-Liege, Belgium, 2499) has shown that in the case of guinea pigs the greater the amount of tannic acid added to the ration, the less digestible the nitrogenous materials become. For instance, a value of 57.9% digestibility was found for a tannic acid level equal to 0%, of 40.6% for a level of 2.5% and of 36.7% for 5%.

G. Charlet-Lery, A. M. Leroy, S. S. Zelter (Annales de Zootechnie 1955, 4, 321–332 "Research into the Alimentary Effectiveness of Farm Apple Residue—Study on the Apparent Digestibility for Sheep and Pigs of the Constituents of Fresh, Ensilaged or Dehydrated Apple Residue") have shown that, for ruminants and monogastric animals, the nitrogenous fraction of apple residue is indigestible, owing to its high tannin content, especially for ruminants and pigs.

Oslage H. J. Becker (M. Arch. Tierernährung, 1958, 8, 271–277 "Versuche über dem Nahrwert von Johannisbrot beim Weiderkauer insbesondere über die Beeinträchtigung der Eiweissverdaulichkeit durch die Gerbsaüre des Futtermittels") have shown that in the case of ruminants, carob proteins are indigestible owing to the presence of tannic acid.

These various prior experiments show that if tannins are used in animal feeding without taking special precautions unsatisfactory results, and feeds which are injurious to the animals' system, may be obtained. The process of the invention therefore provides a reliable method for tanning the proteins of an animal feed without risks of toxicity, and in a way that effectively protects the proteins from bacterial degradation.

The invention is described without in any way being limited by the examples given hereinafter.

A preamble will describe an example of the method of obtaining tanning substances suitable for the requirements of the invention. In this example chestnut wood is treated in a known manner. Similar vegetable matter found in a natural state, such as oak, myrobolan, valonia, quebracho, mimosa, eucalyptus or other plants may be treated in a similar manner.

EXAMPLE 1

Industrial preparation of tannic powder from chestnut wood

The wood, without bark, is reduced to chips. The chips are obtained by a machine which tears the wood in a direction perpendicular to the direction of the fibrovascular bundle, this renders the fibre strongly and quickly pervious to water.

The tanning product is then extracted in batteries of double-bottom diffusion tanks, communicating with one another by pipes.

The extraction liquor from the first tank flows into the next one, and so on. Extraction is carried out by water at about 80° C., which flows through the chips in the first tank; the coloured liquor is pased by syphoning onto those in the second tank, and so on; when the liquor drawn from one of the tanks becomes clear, the treated chips are replaced by a new charge of fresh chips and the tank is then placed at the rear end of the battery.

Water-extraction gives a fairly pure tannin containing little sugar. Water at a temperature higher than 80° C. may be used, or an autoclave may be used to improve the yield. In this case a dark tannin is usually obtained. The tannin can be bleached with sodium bisulphite, this giving a very soluble tannin. In any case, chestnut tannin is very soluble in cold water. The tannin can also be clarified by treating it with a solution of albumine which fixes, by coagulation, the tannic molecules polymerized during extraction, that is to say, the most coloured ones; the reticular coagulum which forms collects at the bottom of the tank and determines a downward filtration of the tannic liquors.

The tannic liquors are concentrated in vacuum at 60–65° C. to form a syrup which are dried in atomizer with a circulation of air by 60–65° C. A very fine powder is thus obtained.

Powder produced from chestnut wood is of a light-brown colour; it is water-soluble; it has an astringent taste and an acid reaction in solution (pH=about 3.0) and a molecular weight of about 1550, compared with 1900 of myrobolan tannin, which belongs to the same group. The commercial powder contains 70–75% of pure tanning substance and some "non-tannin" consisting of a major portion of glucided, a very small amount of inorganic material and water (8 to 10%).

EXAMPLE 2

100 parts of pulverized groundnut or peanut cake, the whole of which passes through sieve ASTM No. 50, and 15 parts of chestnut tanning powder are dry homogenized in a mixing tank provided with blades until an even colour is obtained. 250–300 parts of ordinary water are added progressively, the mass being stirred until a homogenous brownish paste is obtained, which has nothing exuding from it, and the stirring is contained for 5 to 10 minutes after all the water has been incorporated. It is left to stand, the mixture is dried and ground.

After 15 hours of incubation in an artificial rumen, out of 100 g. of nitrogen contained in untreated cake 48.5 g. of ammoniacal nitrogen is found, and out of 100 g. of nitrogen contained in cake tanned according to the process given hereinabove only 0.4 g. of ammoniacal nitrogen is found.

This example shows that the process of the invention provides a surprising degree of protection for the proteins of the cake. It will be noted that the amount of tannin with respect to the crude nitrogenous feed is 15%.

EXAMPLE 3

100 parts of pulverized soja cake (soya bean) and 15 parts of chestnut tannin powder are dry homogenized until an even colour is obtained. 250–300 parts of ordinary water are added progressively, the mass being stirred until a homogeneous brownish paste is obtained. The incorporation of water should be watched carefully, as this is not so easily incorporated as in the case of groundnut (Example 2), so that there is no supernatant water.

The mass is left to stand, then dried and ground. After 15 hours in an artificial rumen, 100 g. of nitrogen contained in the soja cake give 25.3 g. of ammoniacal nitrogen, while 100 g. of the same cake tanned according to the invention give rise to no formation of ammoniacal nitrogen.

This example also shows that the incorporation of 15% of tannin in soja cake, in accordance with the invention, gives effective protection to the proteins of the cake.

EXAMPLE 4

100 parts of powdered cow milk casein or powdered milk, and 15 parts of chestnut tannin powder are dry homogenized until an even colour is obtained. Ordinary water is added, it is left to stand, dried and ground under the same conditions as in Example 2 (groundnut cake at 15%).

After 15 hours in an artificial rumen 100 g. of untreated casein nitrogen produce 80.4 g. of ammoniacal nitrogen, whereas 100 g. of nitrogen from tanned casein only generate 45.6 g. of ammoniacal nitrogen.

It is known, moreover, that casein proteins are almost totally deaminated in the paunch of ruminants.

This example also shows the effectiveness of the process of the invention in the protection of casein proteins.

EXAMPLE 5

100 parts of blood meal are dry homogenized with 15 parts of chestnut tannin powder until an even colour is obtained. Ordinary water is added, it is left to stand, dried and ground under the same conditions as in Example 2 (groundnut cake at 15%). The tanning thus obtained provides an effective protection of food proteins against bacterial degradation.

Similar results are obtained with fish or meat meals, as nitrogenous feeds, or with tannins extracted from oak, myrobolan or quebracho as tanning substances.

EXAMPLE 6

100 parts of fish or meat meal are dry homogenized with 10 parts of chestnut tannin powder until an even colour is obtained. 250–300 parts of ordinary water are progressively added, stirring the mass until a homogeneous brownish paste is obtained, with no exudate, and stirring is continued for 5 to 10 minutes after all the water has been incorporated. It is put to stand, the mixture is dried and ground. Tanning carried out according to the invention in an amount of 10% by weight of tanning substance with respect to the crude nitrogenous feed ensures effective protection of proteins against bacterial degration.

Similar results are obtained by tanning soja or linseed cake with amounts of about 10% by weight of tannin.

EXAMPLE 7

This example is given as a comparison to show the influence of the amount of tannin which should be incorporated into the nitrogenous feed. A groundnut cake was used into which 6% by weight of chestnut tannin was incorporated.

100 parts of powdered groundnut cake and 6 parts of chestnut tannin powder were dry homogenized until an even colour was obtained, water was added, it was left to stand, dried and ground under the same conditions as in Example 2 (groundnut cake at 15%).

After 15 hours of incubation in an artificial rumen, out of 100 g. of nitrogen from untreated cake 48.5 g. of ammoniacal nitrogen was found; 100 g. of nitrogen from cake tanned at 6% gave 27.2 g. of ammoniacal nitrogen.

The protection of proteins against bacterial degradation was therefore insufficient.

EXAMPLE 8

In this example, which is given as a comparison, no tanning was carried out.

100 parts of groundnut cake had 250 to 300 parts of ordinary water added to them, but no tannin. Treatment was carried out under the same conditions as in Example 2 (groundnut cake at 15%), the only difference being that no tannin was added.

After 15 hours of incubation in an artificial rumen, 100 g. of nitrogen from cake having undergone the above-mentioned treatment gave 46.8 g. of ammoniacal nitrogen against 48.5 g. per 100 g. of nitrogen of natural groundnut cake (raw material).

Untanned proteins are therefore very much degraded.

Examples 9 to 11 which follow are given to show the influence of the amount of water incorporated into the mixture of nitrogenous feed and tannin.

As a preliminary, 100 parts of powdered feed and 10 to 15 parts of chestnut tannin were dry homogenized.

EXAMPLE 9

Amounts of water used were equivalent to 2.5 to 3 times the weight of the feed.

Ordinary water was added to the dry feed-tannin mixture, in a proportion of 250 to 300 parts of water to 100 parts of feed. The mixture was stirred progressively incorporating the water until a thick, homogeneous brownish coloured paste was obtained, with no supernatant liquid. The mass did not give off an exudate after standing for 8 to 16 hours.

EXAMPLE 10

An insufficient amount of water was used, equivalent to 1 and 2 times the weight of feed.

Ordinary water was added to the dry feed-tannin mixture in the proportions of 100 or 200 parts of water for 100 parts of feed. After stirring the mixture was powdery and the colour was not homogeneous; many of the feed particles retaining their natural colour, while others were coloured brown. Fixation and distribution of tannin were irregular. Tanning was not satisfactory. Protection of protein against bacterial degradation was therefore not effective.

EXAMPLE 11

An excess amount of water was used, equivalent to 4 times the weight of the feed.

Ordinary water was added to the dry feed-tannin mixture in a proportion 400 parts of water for 100 parts of feed. After stirring the presence of supernatant water was established. Even after standing for several hours, and repeated stirring, supernatant water always appeared. Tanning is insufficient and unhomogeneous as a certain portion of tannin remains dissolved in the liquid and cannot act on the feed during expansion of the proteins.

Furthermore, there is a loss of soluble proteins in the supernatant.

EXAMPLE 12

100 parts of soya cake were mixed with 400 parts of water.

Rehydration is allowed to take place for 6 hours, then 20 parts of chestnut tannin dissolved in 40 parts of water were added.

The mixture was heated to 38° C. and left to react for 3 hours while stirring continuously. The mixture was dried and ground.

EXAMPLE 13

100 parts of fish meal has five times its weight of water added to it.

After a homogeneous mixture is obtained, rehydration is allowed to take place for 24 hours. Then 35 parts of tannin dissolved in 250 parts of water is added.

The mixture is heated to 50° C. If necessary the pH is adjusted to about 5 with hydrochloric acid and the mixture is left to react for 5 hours, with constant stirring. The mixture obtained is dried.

EXAMPLE 14

300 parts of tepid water at 30° C. are added to 100 parts of groundnut cake.

This is intimately mixed for 2 hours, then 25 parts of powdered oak wood tannin are added, while continuing the stirring, and the mixture is heated gradually until it reaches a temperature of 45° C. This temperature is maintained for 8 hours. It is left to stand for 2 hours and is then dried.

EXAMPLE 15

600 parts of water are added to 100 parts of blood meal.

It is mixed for 2 hours and 40 parts of myrobolan tannin, dissolved in 100 parts of water, are added.

The mixture is heated to 55° C. in three hours. Liquids are removed by centrifugation and the paste obtained is dried.

EXAMPLE 16

100 parts of gelatine are dissolved in 400 parts of water while warm.

It is stirred and 40 parts of mimosa tannin are added. The mass is mixed at 25° C. after its pH has been adjusted to 4.5 with acetic acid. Mixing lasts for 8 hours, after which the mixture is dried by infra-red rays and ground.

EXAMPLE 17

250 parts of water are added to 100 parts of meat meal.

After intimate mixing it is left to stand for 48 hours, then the mass is heated to 40° C. and 25 parts of chestnut tannin dissolved in 250 parts of water are added. The mixture is maintained at 40° C. for 8 hours and is dried at a low temperature.

EXAMPLE 18

100 parts of glycine are dissolved in 400 parts of water at 50° C., then, while continuing to stir thoroughly, 50 parts of chestnut tannin dissolved in 50 parts of water are added. The stirring is continued for another 30 minutes, then during the whole drying operation, which may be carried out in two stages, for instance, vacuum evaporation of the greater part of the water and then atomization.

The following examples relate to experiments on animals.

EXAMPLE 19

This example is given to show that nitrogenous feeds tanned according to the invention are not toxic.

Lambs which had been weaned early, at the age of 1 month, and which are therefore extremely sensitive to a change of diet, were given groundnut, linseed and soya proteinic cakes tanned according to the invention (10 to 15% by weight of powdered chestnut tannin) from the age of 30 days until they were 140 days old, at a rate of 1.4 g. per kg. of body weight, from the age of 1 month. The presence of tannin did not affect their appetite. No toxic effects were noticed; after being slaughtered at 140 days, compared with control lambs which had not received tannin, the viscera were normal (liver, heart, rumen, fourth stomach, intestine, kidneys). Histological examination revealed not the slightest trace of lesions in the organs. The only difference observed between the control animals and those which had eaten tanned feed was a salmon-coloured tint of the rumen and fourth stomach mucous membranes, and a grey tint of the intestinal ones.

The lymphatic glands were a grey colour, particularly in the medullar portion, while they were white in the control animals, the cortex of the kidney was grey coloured. Apart from this colouring the glands and kidneys were normal. In the case of animals slaughtered about 15 days after suppression of tanning feeds the colouring had disappeared.

EXAMPLE 20

This example was carried out on adult sheep having rumen fistula. For comparison observations were carried out on two batches of sheep fed respectively with untanned groundnut cake and tanned groundnut cake according to the invention.

For several months a batch of sheep had distributed to them the same feed mixture in the form of conglomerates and composed of wheat straw, meadow hay, dried beet pulp, groundnut cake and mineral salts, so that it formed a complete feed covering all the nutritional requirements of these animals. The cake was introduced either untanned, or tanned at 15 g. per 100 g. and it provided 70% of the total nitrogenous materials of the feed. The complete feed contained 2.5% of chestnut wood tanning substances provided by cake treated according to the invention.

The amount of ammoniacal nitrogen present in 100 ml. of liquid from rumen were lower by 40% when the sheep ate the feed with tanned cake, with respect to the untanned feed. The total amount of ammoniacal nitrogen found in the liquid from the rumen 60 minutes after a meal was eaten was 32% lower when the feed contains tannin. These statistically very significant results prove the effectiveness of the tanning process of the invention. The maximum concentration of urea in the jugular blood was lower by 20% in the presence of tannin. The total amounts of total volatile fatty acids (acetic acid+propionic acid+butyric acid) present in the liquid of the rumen at the same time were not significantly influenced by the presence of tannin in the feed. Taken separately the acetic and propionic acids did not vary, only the butyric acid diminishes by 40%.

EXAMPLE 21

Another comparative experiment was carried out using feed containing tanned or untanned soya cake. A group of fistulized sheep consumed the same feed mixture except that the groundnut cake of Example 21 was replaced by soya cake. The amounts of ammoniacal nitrogen measured in 100 ml. of liquid from the rumen were lower by 22% due to action of the tannin.

The total amount of ammoniacal nitrogen found in the rumen 60 minutes after the meal was 23% lower when the feed contained tannin and the maximum concentration of urea in the jugular blood was lower by 16%. The total amounts of total volatile fatty acids, acetic and propionic acids found in the rumen after 60 minutes were not significantly different in the presence of tannin, only butyric acid was lower by 21%.

EXAMPLE 22

In this example, an experiment was carried out on adult sheep to compare the digestibility of tanned and untanned feeds.

A group of fistulized adult sheep consumed the same feed mixture containing groundnut and soya cakes, which were either tanned or untanned. The presence of tanned cake in the mixture did not alter the balance of digestion, that is, the total amount of feed digested in the alimentary tract.

The digestibility coefficients of diets of untanned cake and tanned cake were respectively as follows: 60.3 and 60.2% for dry materials, 62.3 and 62.4% for organic materials, 50.6 and 52.5% for cellulosic materials. It is therefore established that the presence of tannin in no way alters the utilization of the energy, and particularly the cellulose of fodders introduced into the ration (63% of the total dry material), fodders which form the basic feed in feeding ruminants.

EXAMPLE 23

In this example, an experiment was carried out on the enzymatic digestibility in vitro of the proteins of tanned and untanned cake.

The nitrogen of a groundnut cake, tanned at 15%, was digested at 93.5% in vitro by the successive action of proteolytic enzymes: pepsin and trypsin. This same cake, treated with water, dried and ground under the same conditions as the tanned cake, was digested at 94%. The nitrogen of a soya cake, tanned at 15%, was digested at 89.4% by proteolytic enzymes, whilst that of the same cake, treated by water, was digested at 92.6%. It is thus seen that the presence of tannin does not affect the digestion by proteolytic enzymes of the proteins of the cake.

The preceeding examples prove the effectiveness of the tanning process of the invention for the protection of consumable foodstuffs against bacterial degradation in the alimentary tract of animals.

What we claim is:

1. A process of making proteinaceous animal feeds that are protected against bacterial deamination in the upper regions of the alimentary tract of animals which comprises forming a paste at a temperature not in excess of 80° C. with the proteinaceous animals feed, swelling amounts of water and an effective non-toxic amount of an organic tanning substance which forms complexes with said proteinaceous feed which stabilizes proteins against bacterial action in the upper regions of the alimentary track of an animal but are dissociable by proteolytic enzymes in the alimentary tract of the animal beyond said upper regions, allowing said paste to stand and said tanning substance to react and form a complex with said proteinaceous feed and drying the resulting product at a temperature not exceeding 80° C.

2. The process of claim 1, wherein said tanning substance is a hydrolysable tanning substance.

3. The process of claim 1 wherein said tanning substance is of plant origin.

4. The process of claim 1 wherein said tanning substance is of synthetic origin.

5. The process of claim 1, wherein the amount of said tanning substance in said paste is 3–40% by weight of said nitrogenous feed.

6. The process of claim 5, wherein said tanning substance is used at an amount of 9 to 15% by weight of said nitrogenous feed.

7. The process of claim 1, wherein said tanning substance and said nitrogenous feed are used both in the form of fine powder.

8. The process of claim 7, wherein said nitrogenous feed and tanning substance are dry mixed prior to adding water and forming said paste.

9. The process of claim 8, wherein water is added in an amount between 2.5 to 3 times the weight of said dry mixture consisting of said tanning substance and said nitrogenous feed.

10. The process of claim 1, wherein said nitrogenous feed is in the form of an aqueous solution.

11. The process of claim 1 wherein said tanning substance is in the form of an aqueous solution.

12. The process of claim 1 wherein said tanning substance is in the form of a basic solution having a pH greater than 8.

13. The process of claim 1 wherein the pH of said aqueous medium is adjusted by adding acid.

14. The process of claim 1, wherein said water is at a temperature not higher than 70° C.

15. The process of claim 1, wherein said water is at a temperature substantially in the range of 20–25° C.

16. The process of claim 8, wherein the temperature of said water added is not higher than 70° C.

17. The process of claim 8, wherein the temperature of said water added lies in the range of 20–25° C.

18. The process of claim 1, wherein said paste is allowed to stand for a period of between 12 and 16 hours at room temperature.

19. The process of claim 8, wherein said paste is allowed to stand for a period of between 12 and 16 hours at room temperature.

20. The process of claim 1, wherein said drying is continued until a residual moisture content of 8 to 10% is obtained.

21. The process of claim 8, wherein said drying is effected until a residual moisture content of 8 to 10% is obtained.

22. The process of claim 1, wherein sodium chloride is added to said water.

23. The process of claim 8, wherein sodium chloride is added to the mixture of said nitrogenous feed and said tanning substance.

24. A dry animal feed protected against bacterial deamination in the upper regions of the alimentary tract of animals, said feed being produced by forming a paste at a temperature not in excess of 80° C. with a proteinaceous animal feed, swelling amounts of water and 3 to 40% by weight of an organic tanning substance relative to the weight of the said proteinaceous feed, said tanning substance being capable of forming a complex with said proteinaceous feed in said paste which stabilizes the proteins thereof against bacterial actions in the upper regions of the alimentary tract of an animal but permits dissociation by proteolytic enzymes in the alimentary tract of the animals beyond said upper regions, allowing said paste to stand and said tanning substance to react and form a complex with said proteinaceous feed and drying the resulting product at a temperature not exceeding 80° C. to obtain said dry animal feed.

25. The product of claim 24, wherein the amount of said tanning substance is 9–15% by weight of said nitrogenous feed.

26. A process for animal feeding comprising feeding of said animal with the nitrogenous feed of claim 24 the amount of tanning substance not exceeding 2.5% of the total dry material consumed daily by said animal.

27. A process for animal feeding comprising feeding of said animals with the nitrogenous feed of claim 25 tanning substance not exceeding 2.5% of the total dry material consumed daily by said animal.

References Cited

UNITED STATES PATENTS

| | | | |
|---|---|---|---|
| 2,296,211 | 9/1942 | Krzikalla et al. | 260—566 |
| 2,753,371 | 7/1956 | Barnes | 260—473.5 |
| 2,819,968 | 1/1958 | Colby | 99—2 |
| 2,868,773 | 1/1959 | Kress | 260—112 |
| 3,248,255 | 4/1966 | Belasco et al. | 99—2 |

OTHER REFERENCES

Kutsidi et al.: Chem. Abstr., The Nature of the Reaction Between Tannins and Melamine-Formaldehyde Resins, p. 4233e, vol. 62, 1965.

Zitko et al.: C.A., Effect of Tannin on the Reaction of Pectin with Gelatin, vol. 59, p. 13048b, 1963.

LIONEL M. SHAPIRO, Primary Examiner